US012712637B2

(12) United States Patent
Kanai et al.

(10) Patent No.: US 12,712,637 B2
(45) Date of Patent: Aug. 18, 2026

(54) OPTICAL COMMUNICATION DEVICE AND CONTROL METHOD

(71) Applicant: NTT, Inc., Tokyo (JP)

(72) Inventors: Takuya Kanai, Musashino (JP); Kazuaki Honda, Musashino (JP); Yasunari Tanaka, Musashino (JP); Shin Kaneko, Musashino (JP); Kazutaka Hara, Musashino (JP)

(73) Assignee: NTT, Inc., Tokyo (JP)

( * ) Notice: Subject to any disclaimer, the term of this patent is extended or adjusted under 35 U.S.C. 154(b) by 260 days.

(21) Appl. No.: 18/561,416

(22) PCT Filed: May 21, 2021

(86) PCT No.: PCT/JP2021/019401
§ 371 (c)(1),
(2) Date: Nov. 16, 2023

(87) PCT Pub. No.: WO2022/244252
PCT Pub. Date: Nov. 24, 2022

(65) Prior Publication Data
US 2024/0372625 A1 Nov. 7, 2024

(51) Int. Cl.
*H04B 10/516* (2013.01)
*H04J 3/00* (2006.01)

(52) U.S. Cl.
CPC .............. *H04B 10/516* (2013.01); *H04J 3/00* (2013.01)

(58) Field of Classification Search
CPC ................................ H04B 10/516; H04J 3/00
See application file for complete search history.

(56) References Cited

U.S. PATENT DOCUMENTS 6,331,792 B1 12/2001 Tonietto
6,909,853 B1 6/2005 Yamashita
7,519,300 B2 4/2009 Ohtani et al.
2006/0110162 A1 5/2006 Tian et al.
2013/0071104 A1 3/2013 Nakashima et al.
2015/0229389 A1 * 8/2015 Kim .................... H04B 10/073 398/17

(Continued)

FOREIGN PATENT DOCUMENTS

JP 10-229384 A 8/1998
JP 2001-077792 A 3/2001

(Continued)

OTHER PUBLICATIONS

K. Honda et al., "WDM Passive Optical Network Managed with Embedded Pilot Tone for Mobile Fronthaul", ECOC2015, We.3.4.4, 2015.

(Continued)

*Primary Examiner* — Pranesh K Barua
(74) *Attorney, Agent, or Firm* — Harness, Dickey & Pierce, P.L.C.

(57) ABSTRACT

One mode of the present invention is an optical communication device that includes: a detector that detects the falling edge or the rising edge of a control signal outputted from a user device to an optical communication path; and an optical modulator that superimposes a new control signal on a main signal, when the falling edge or the rising edge of a control signal has been detected by the detector.

7 Claims, 5 Drawing Sheets

(56) References Cited

U.S. PATENT DOCUMENTS

| | | | | |
|---|---|---|---|---|
| 2015/0326310 | A1* | 11/2015 | Fujii | H04J 14/0293 398/3 |
| 2016/0285582 | A1 | 9/2016 | Kato et al. | |
| 2019/0190603 | A1* | 6/2019 | Asada | H04B 10/516 |
| 2020/0073196 | A1* | 3/2020 | Yutani | H04B 10/43 |
| 2024/0168359 | A1* | 5/2024 | Yutani | G02F 1/2252 |

FOREIGN PATENT DOCUMENTS

| | | | | |
|---|---|---|---|---|
| JP | 2006-148922 | A | 6/2006 | |
| JP | 2006-197489 | A | 7/2006 | |
| JP | 2013-070123 | A | 4/2013 | |
| JP | 2016-184896 | A | 10/2016 | |
| WO | WO-2017/104075 | A1 | 6/2017 | |
| WO | WO-2017212555 | A1 * | 12/2017 | H04B 10/2507 |

OTHER PUBLICATIONS

Goji Nakagawa et al., "Development of evaluation platform of AMCC superimposition on CPRI signal transmission for mobile fronthaul network", 2017 European Conference on Optical Communication (ECOC), Sep. 2017.

Goji Nakagawa et al., "Compact and low cost superimposition of AMCC with magneto-optic VOA", 2017 Optical Fiber Communications Conference and Exhibition (OFC), Mar. 2017.

K. Sato et al., "Reduction of Mode Partition Noise by Using Semiconductor Optical Amplifiers", IEEE Journal of Selected Topics in Quantum Electronics, vol. 7, No. 2, pp. 328-333, 2001.

* cited by examiner

FIG. 5

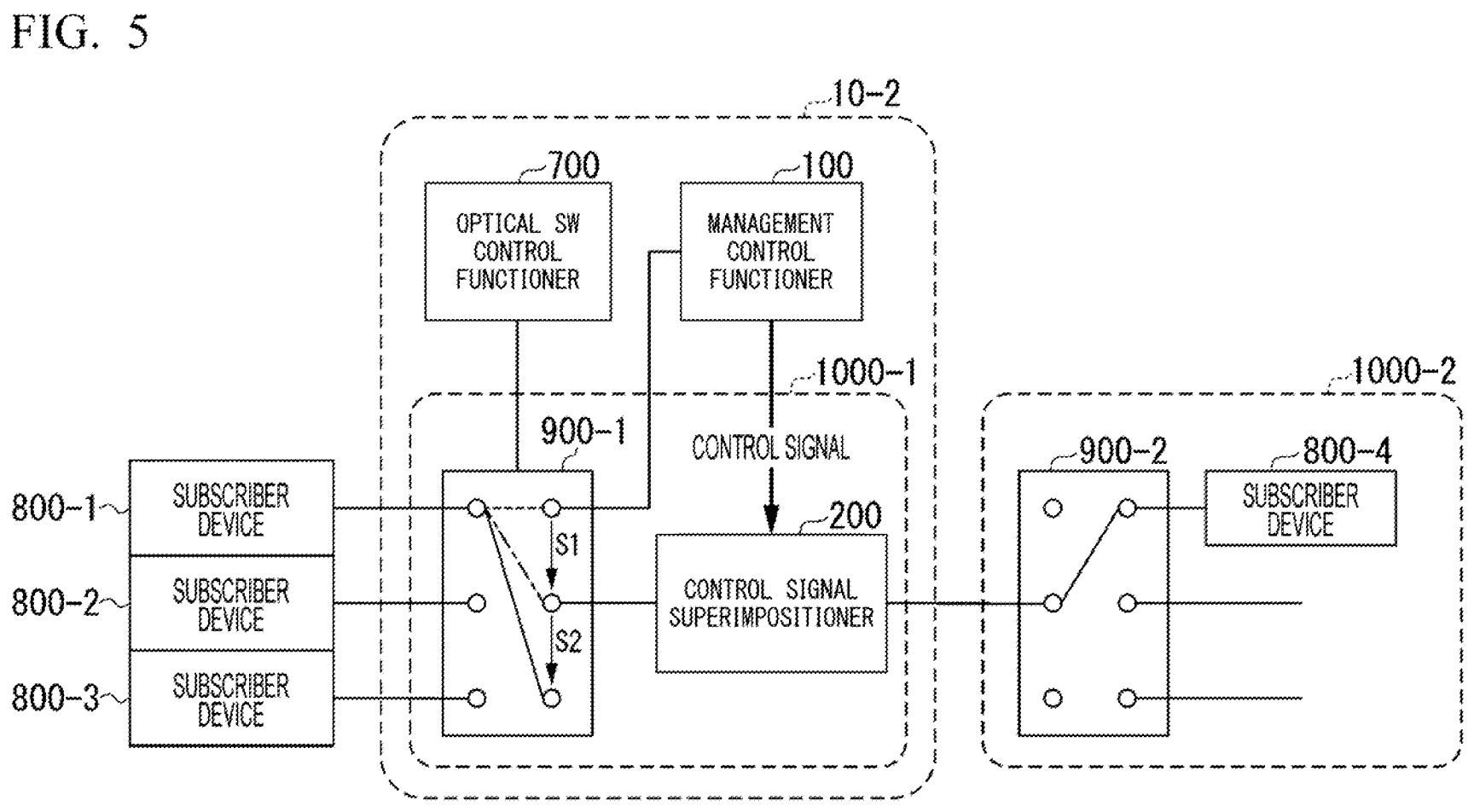

10-2
100 MANAGEMENT CONTROL FUNCTIONER
700 OPTICAL SW CONTROL FUNCTIONER
1000-1
CONTROL SIGNAL
200 CONTROL SIGNAL SUPERIMPOSITIONER
900-1
S1
S2
800-1 SUBSCRIBER DEVICE
800-2 SUBSCRIBER DEVICE
800-3 SUBSCRIBER DEVICE
1000-2
900-2
800-4 SUBSCRIBER DEVICE

FIG. 7

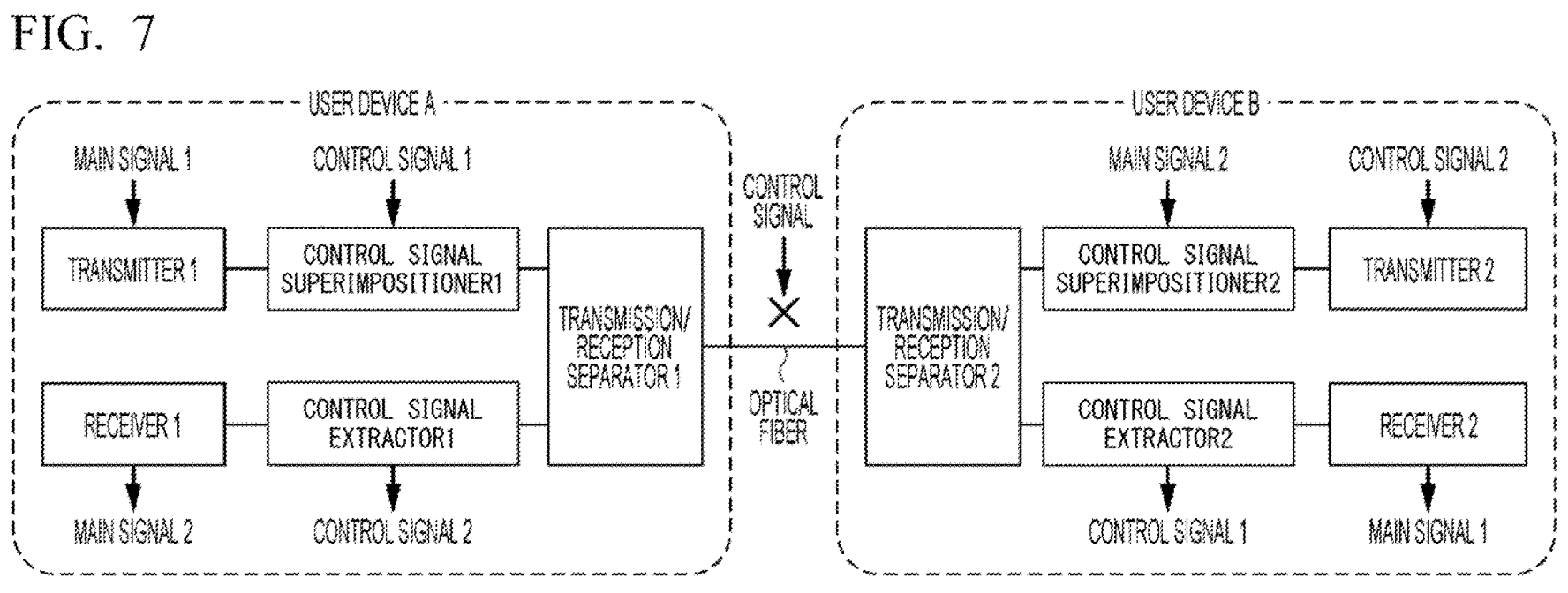

USER DEVICE A
MAIN SIGNAL 1
TRANSMITTER 1
CONTROL SIGNAL 1
CONTROL SIGNAL SUPERIMPOSITIONER1
RECEIVER 1
MAIN SIGNAL 2
CONTROL SIGNAL EXTRACTOR1
CONTROL SIGNAL 2
TRANSMISSION/ RECEPTION SEPARATOR 1
CONTROL SIGNAL
OPTICAL FIBER
USER DEVICE B
TRANSMISSION/ RECEPTION SEPARATOR 2
MAIN SIGNAL 2
CONTROL SIGNAL SUPERIMPOSITIONER2
CONTROL SIGNAL 2
TRANSMITTER 2
CONTROL SIGNAL EXTRACTOR2
CONTROL SIGNAL 1
RECEIVER 2
MAIN SIGNAL 1

OPTICAL COMMUNICATION DEVICE AND CONTROL METHOD

CROSS-REFERENCE TO RELATED APPLICATIONS

This application is a 371 U.S. National Phase of International Application No. PCT/JP2021/019401, filed on May 21, 2021. The entire disclosure of the above application is incorporated herein by reference.

TECHNICAL FIELD

The present invention relates to a technology for an optical communication device and a control method.

BACKGROUND ART

As illustrated in FIG. 7, user devices are connected by an optical fiber, and communication using an optical signal is performed between optical transmitters/receivers mounted in the user devices. A user device A in FIG. 7 includes a transmitter 1, a receiver 1, a control signal superimpositioner 1, a control signal extractor 1, and a transmission/reception separator 1. A user device B includes a transmitter 2, a receiver 2, a control signal superimpositioner 2, a control signal extractor 2, and a transmission/reception separator 2.

In the user device A, a main signal 1 is outputted from the transmitter 1, a control signal 1 including state information (about wavelength, power, temperature, and the like) is superimposed thereon by the control signal superimpositioner 1, and the resultant signal is outputted to the optical fiber via the transmission/reception separator 1. At this point of time, a control signal is superimposed as an auxiliary management and control channel (AMCC) in a low-frequency band that does not interfere with the main signal. As a result, the signals can be handed as physically separate signals.

The user device B converts the received optical signal into electrical signals with a photodiode (PD) or the like, separates the electrical signals, and handles the electrical signal as individual electric signals. In the user device B, the control signal extractor 2 extracts the control signal 1 from the signal received via the transmission/reception separator 1, and the receiver 2 receives the main signal 1. Communication from the user device B to the user device A is performed in the same manner.

CITATION LIST

Non Patent Literature

Non Patent Literature 1: K. Honda et al., "WDM Passive Optical Network Managed with Embedded Pilot Tone for Mobile Fronthaul," ECOC2015, We. 3.4.4, 2015.

SUMMARY OF INVENTION

Technical Problem

By a conventional technology, a control signal is transmitted/received between the user devices A and B as illustrated in FIG. 7. Therefore, it is difficult for a device other than a user device to superimpose a new control signal on a main signal during communication between user devices.

In view of the above circumstances, the present invention aims to provide a technology for enabling superimposition of a new control signal on a main signal.

Solution to Problem

One mode of the present invention is an optical communication device that includes: a detector that detects the rising edge or the falling edge of a control signal outputted from a user device to an optical communication path; and an optical modulator that superimposes a new control signal on a main signal, when the rising edge or the falling edge of a control signal has been detected by the detector.

One mode of the present invention is a control method that includes: a detection step in which a detector detects the rising edge or the falling edge of a control signal outputted from a user device to an optical communication path; and a superimposition step in which an optical modulator superimposes a new control signal on a main signal, when the rising edge or the falling edge of a control signal has been detected in the detection step.

Advantageous Effects of Invention

The present invention enables superimposition of a new control signal on a main signal.

BRIEF DESCRIPTION OF DRAWINGS

FIG. 5 is a diagram illustrating an example configuration of an optical communication device 10-2.

FIG. 7 is a diagram illustrating an example of a conventional configuration.

DESCRIPTION OF EMBODIMENTS

Figure 1:
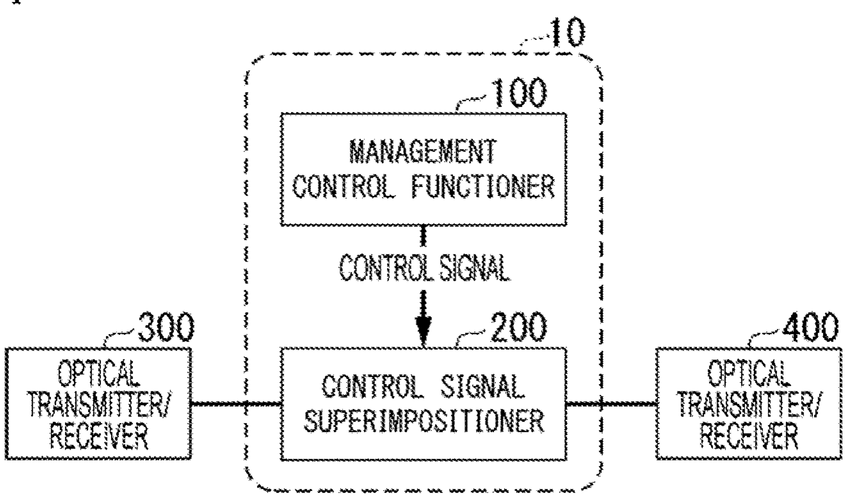
FIG. 1 is a diagram illustrating the basic configuration of an optical communication device 10.

The following is a detailed description of an embodiment of the present invention, with reference to the drawings. Note that, in the drawings, like components are denoted by like reference signs, and explanation thereof will not be repeated.

FIG. 1 is a diagram illustrating the basic configuration of an optical communication device 10. The optical communication device 10 is connected to optical transmitters/receivers 300 and 400 via optical fibers (optical communication paths). Also, the optical communication device 10 includes a management control functioner 100 and a control signal superimpositioner 200.

The optical transmitters/receivers 300 and 400 are an example of user devices. The optical transmitters/receivers 300 and 400 can transmit/receive a control signal including various kinds of configuration parameters of the optical transmitters/receivers and user information by superimposing the control signal on a main signal that is a user signal.

The optical transmitters/receivers 300 and 400 also transmit/receive control signals as intermittent burst signals provided at certain intervals.

The management control functioner 100 in the optical communication device 10 outputs a control signal to be superimposed on a main signal, to the control signal superimpositioner 200. The control signal superimpositioner 200 superimposes the control signal outputted from the management control functioner 100 between intermittent control signals transmitted from the optical transmitter/receiver 300.

Figure 2A:
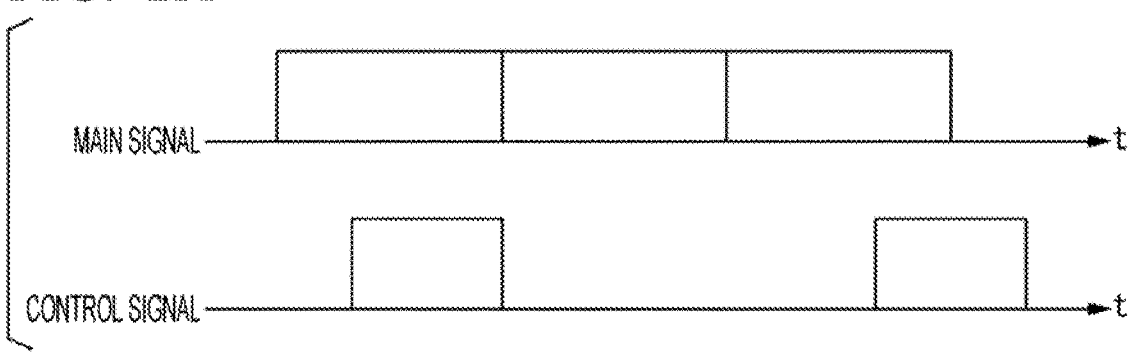
FIG. 2A is a diagram illustrating an example of transmission of a main signal and control signals.
Figure 2B:
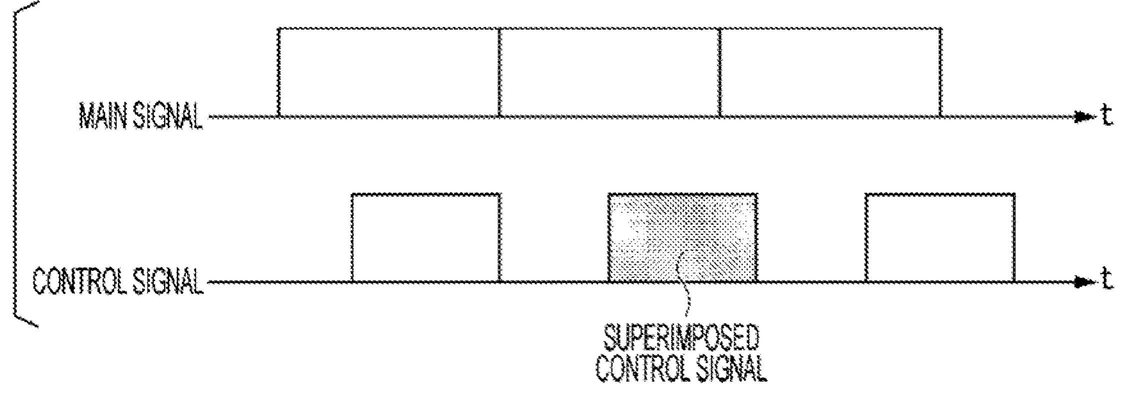
FIG. 2B is a diagram for explaining control signal superimposition.

Specifically, an example in which a signal is transmitted from the optical transmitter/receiver 300 to the optical transmitter/receiver 400 is described. FIGS. 2A and 2B are diagrams for explaining control signal superimposition. FIG. 2A is a diagram illustrating an example of transmission of a main signal and control signals. In FIG. 2A, the abscissa axis indicates time. As illustrated in FIG. 2A, control signals are transmitted as burst signals.

As illustrated in FIG. 28, the control signal superimpositioner 200 superimposes a control signal outputted from the management control functioner 100 between intermittent control signals transmitted from the optical transmitter/receiver 300. The optical transmitter/receiver 400 on the reception side performs the same processing as that for a normal control signal. Also, in a case where a signal is transmitted from the optical transmitter/receiver 400 to the optical transmitter/receiver 300, control signals are superimposed in the same manner.

As described above, control signals from an optical transmitter/receiver are used as intermittent burst signals, and time division multiplexing (TDM) is further performed on the control signals in a transmission path. Thus, superimposition (modulation) of a new control signal in a transmission path, which has been difficult by a conventional technique, becomes possible.

Note that the intervals between the intermittent control signals transmitted from the optical transmitters/receivers 300 and 400 may be predetermined intervals or any appropriate intervals. In a case where the control signal intervals are any appropriate intervals, the maximum frame size of a control signal frame may be defined in advance, and the intervals may be made equal to or greater than the maximum frame size. For example, as will be described later, the intervals may be determined in accordance with the control signal superimpositioner 200.

Figure 3:
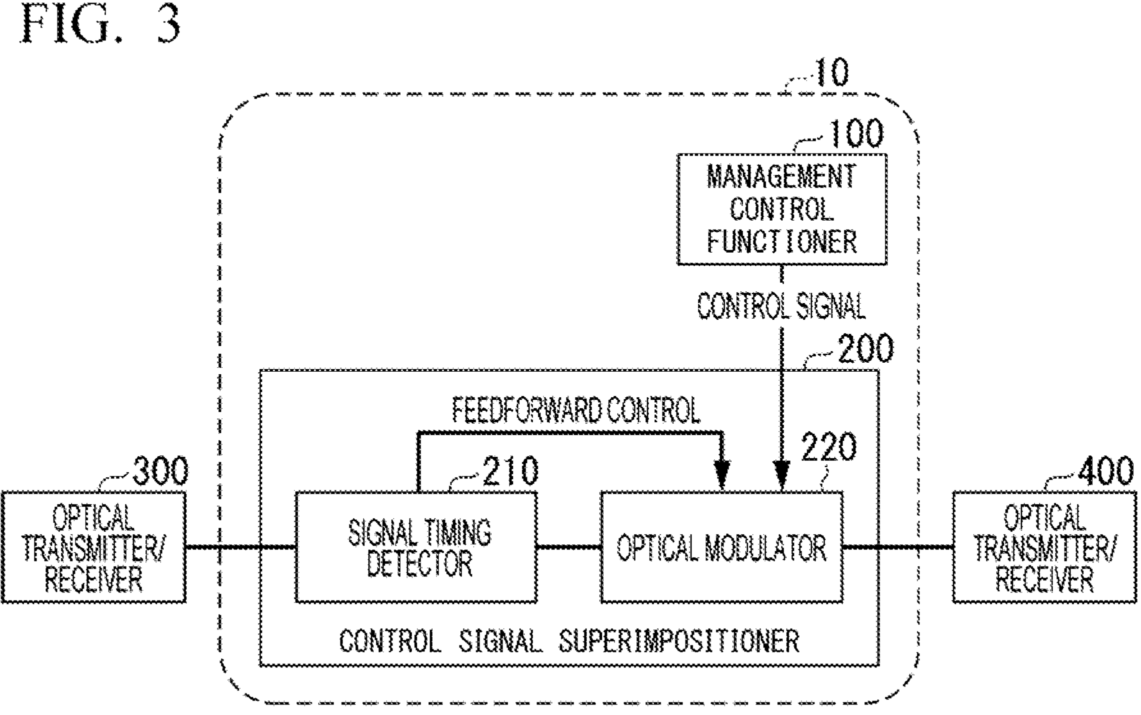
FIG. 3 is a diagram illustrating an example configuration of a control signal superimpositioner 200.

Next, an example configuration of the control signal superimpositioner 200 is described. FIG. 3 is a diagram illustrating an example configuration of the control signal superimpositioner 200. The control signal superimpositioner 200 includes a signal timing detector 210 and an optical modulator 220. The signal timing detector 210 and the optical modulator 220 can transmit and receive signals to and from each other. For transmission and reception of signals, a wiring line capable of transmitting and receiving electrical signals may be provided between the signal timing detector 210 and the optical modulator 220, for example.

The signal timing detector 210 detects a rising edge or a falling edge of a control signal outputted from the optical transmitter/receiver 300. The optical modulator 220 is a mechanism capable of applying a signal inputted to the optical modulator as a modulation signal to inputted light, and is a lithium niobate ($LiNbO_3$; LN) modulator, an electro-absorption (EA) modulator, a semiconductor optical amplifier (SOA), or the like, for example. The optical modulator 220 receives a new control signal from the management control functioner 100, and performs superimposition of the received new control signal. The new control signal to be superimposed is also referred to as the "new control signal".

When the signal timing detector 210 detects a falling edge of the control signal outputted from the optical transmitter/receiver 300, the optical modulator 220 is notified of the detection of the falling edge by feedforward control. In a case where detection of a falling edge is reported, the optical modulator 220 sets it as a start time of a non-signal period, and performs superimposition of the new control signal.

At this point of time, the period of time from the detection of the falling edge by the signal timing detector 210 to the actual superimposition of the new control signal by the optical modulator 220 is defined as a response time $\tau$ of the control signal superimpositioner 200.

The intermittent control signal intervals at which control signals are outputted in the optical transmitters/receivers 300 and 400 are set so that control signals outputted from the optical transmitters/receivers 300 and 400 do not collide with the new control signal as described above. Specifically, the response time $\tau$, which is the period of time from detection of a falling edge of a control signal by the signal timing detector 210 to superimposition of the new control signal by the optical modulator 220, is equal to or shorter than the time obtained by dividing, by 2, the time obtained by subtracting the control signal transmission time from the intervals at which the optical transmitters/receivers 300 and 400 transmit control signals. Note that the transmission time here is the transmission time of the control signal having the largest size among control signals.

Conversely, in a case where the intervals at which control signals from the optical transmitter/receiver 300 are transmitted can be set, intervals that are longer than the time obtained by adding the control signal transmission time to the time twice the response time $\tau$ are set, so that the new control signal can avoid a collision.

In the embodiment described above, the signal timing detector 210 detects a falling edge of a control signal outputted from the optical transmitter/receiver 300. However, a case where a rising edge is to be detected is now described. For example, the frame size of a control signal frame is defined in advance, and control signal intervals are set to be equal to or longer than the time (referred to as "T1") required for transmitting the frame size. In this case, the signal timing detector 210 detects a rising edge, and the timing (referred to as "timing T2") at which T1 elapses since the timing of the detection is the falling timing. Any control signal is not transmitted until at least the time T1 elapses since the timing 12. Accordingly, the optical modulator 220 sets the timing T2 as the falling edge detection timing, and superimposes the new control signal in the same manner as in a case where a falling edge is detected. In this manner, even in a configuration in which the signal timing detector 210 detects a rising edge, the new control signal can be superimposed.

(First Modification)

Figure 4:
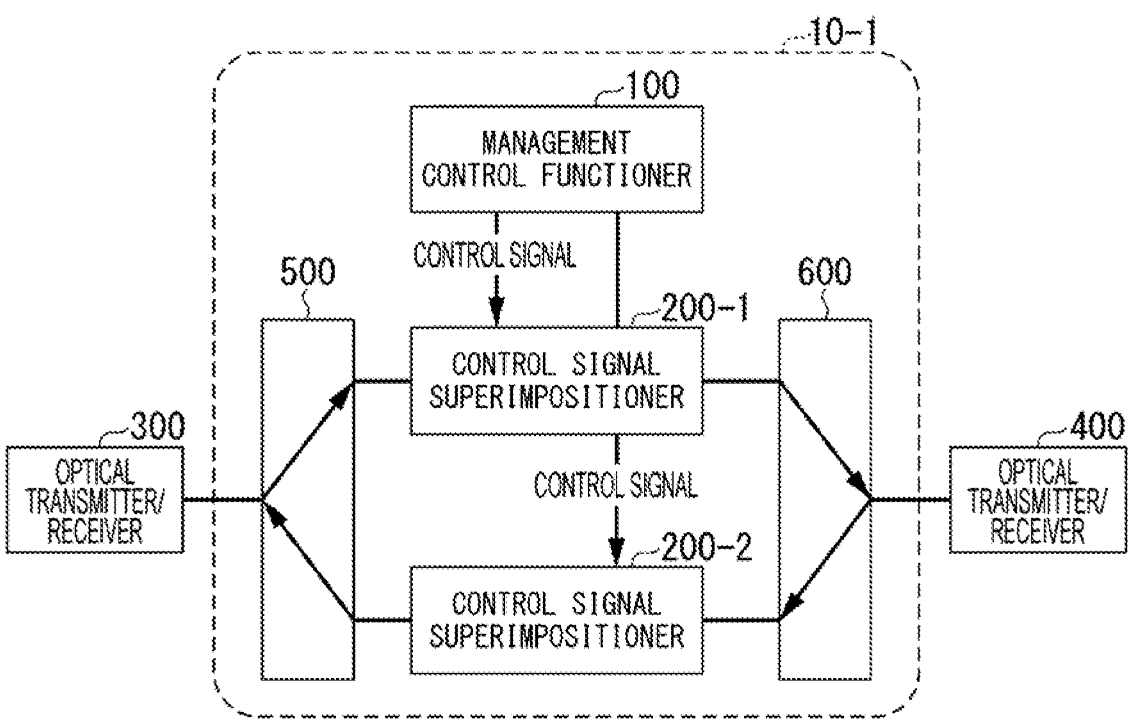
FIG. 4 is a diagram illustrating an example configuration of an optical communication device 10-1.

FIG. 4 is a diagram illustrating an example configuration of an optical communication device 10-1 that is a first modification of the optical communication device 10. The optical communication device 10-1 according to the first modification includes transmission/reception separators 500 and 600. The optical communication device 10-1 also includes two control signal superimpositioners 200-1 and 200-2. The control signal superimpositioners 200-1 and 200-2 each include the signal timing detector and the optical modulator described with reference to FIG. 3. The management control functioner 100 outputs the new control signal to each of the control signal superimpositioners 200-1 and 200-2.

The new control signal to be superimposed by the control signal superimpositioners 200-1 and 200-2 uses a pilot tone that is the same frequency as the control signals to be transmitted by the optical transmitters/receivers 300 and 400 or a frequency in a lower frequency region than the main signal. Note that a high frequency may be used, as long as the optical transmitters/receivers 300 and 400 can separate the main signal from the control signals. Note that, as the pilot tone, a signal up-converted to a high frequency (500 KHz, for example) at a level that does not affect the main signal may be used, or a signal modulated in the baseband may be used.

The optical transmitter/receiver 300 and the transmission/reception separator 500 are connected by an optical fiber. The transmission/reception separator 500 and the control signal superimpositioner 200-1 are connected by an optical fiber. The transmission/reception separator 500 and the control signal superimpositioner 200-2 are connected by an optical fiber. The transmission/reception separator 600 and the control signal superimpositioner 200-1 are connected by an optical fiber. The transmission/reception separator 600 and the control signal superimpositioner 200-2 are connected by an optical fiber. The optical transmitter/receiver 400 and the transmission/reception separator 600 are connected by an optical fiber.

A signal transmitted from the optical transmitter/receiver 300 is inputted to the control signal superimpositioner 200-1 via the transmission/reception separator 500, the new control signal is superimposed thereon, and the resultant signal is transmitted to the optical transmitter/receiver 400 via the transmission/reception separator 600. Conversely, a signal transmitted from the optical transmitter/receiver 400 is inputted to the control signal superimpositioner 200-2 via the transmission/reception separator 600, the new control signal is superimposed thereon, and the resultant signal is transmitted to the optical transmitter/receiver 300 via the transmission/reception separator 500. Unlike conventional ones, the control signal superimpositioners 200-1 and 200-2 enable transmission of a control signal for setting the wavelength from the management control functioner 100 even after the connection of the optical transmitters/receivers 300 and 400 is completed.

In a case where an optical signal outputted to an optical communication path includes uplink and downlink signals as above, two optical modulators that are an uplink-signal optical modulator (an optical modulator included in the control signal superimpositioner 200-1) that superimposes the new control signal on the uplink signal, and a downlink-signal optical modulator (an optical modulator included in the control signal superimpositioner 200-2) that superimposes the new control signal on the downlink signal are provided as the optical modulators.

(Second Modification)

FIG. 5 is a diagram illustrating an example configuration of an optical communication device 10-2 that is a second modification of the optical communication device 10. The optical communication device 10-2 according to the second modification includes a switch 900-1 and an optical SW control functioner 700. The switch 900-1 connects subscriber devices 800-1, 800-2, and 800-3 to the management control functioner 100 and the control signal Superimpositioner 200. The optical SW control functioner 700 controls the switch 900-1. The control signal superimpositioner 200 is connected to a switch 900-2. The switch 900-2 is connected to a subscriber device 800-4.

The switch 900-1 and the control signal superimpositioner 200 are collectively referred to as a GW 1000-1. The switch 900-2 and the subscriber device 800-4 are collectively referred to as a GW 1000-2. The subscriber devices 800-1, 800-2, 800-3, and 800-4 include the functions included in the optical transmitters/receivers 300 and 400 described above. The management control functioner 100 is an example of a setter. The switch 900-1 is an example of a connection destination switcher.

Each of the subscriber devices 800-1, 800-2, and 800-3 is connected to the optical communication device 10-2 by an optical fiber. The optical communication device 10-2 and the GW 1000-2 are connected by an optical fiber.

An operation to be performed when the subscriber device 800-1 is newly connected in the configuration illustrated in FIG. 5 is now described. The subscriber device 800-1 is first connected to the management control functioner 100 by the switch 900-1. In the subscriber device 800-1, the wavelength corresponding to the communication destination (a service, a user, or the like) is set by the management control functioner 100.

After that, the switch 900-1 switches paths under the control of the optical SW control functioner 700 (S1). As a result, the subscriber device 800-1 starts communication with a desired connection destination (the subscriber device 800-4 in the case illustrated in FIG. 5) via the control signal superimpositioner 200.

In a case where the subscriber device 800-1 is connected to another subscriber device that is different from the subscriber device 800-4 while the subscriber device 800-1 and the subscriber device 800-4 are communicating with each other (a case where a switch request is transmitted from the subscriber device 800-1, for example), the wavelength to be used in the communication with another subscriber device needs to be set.

An example configuration that receives a switch request is now described. A brancher that branches a control signal to be exchanged between subscriber devices is provided between the switch 900-1 and the control signal superimpositioner 200. Also, a control TRx that receives a signal branched from the brancher is provided in the optical communication device 10-2. In a case where the subscriber device 800-1 switches communication destinations in this configuration, for example, the subscriber device 800-1 transmits a disconnection request to the subscriber device 800-4. The disconnection request is a signal indicating that the connection of communication is to be cut off after that.

The control TRx transmits an ACK to the subscriber device 800-1, in response to the disconnection request received through demodulation of the control signal branched from the brancher. The subscriber device 800-1 stops light emission to the communication path, in response to the transmission of the disconnection request. The optical SW control functioner 700 recognizes the stop of light emission.

When a predetermined time has elapsed since the stop of light emission, the subscriber device 800-1 restarts light emission to the communication path. When light is detected at an input/output port to which light has not been inputted over a predetermined time, the optical SW control functioner 700 connects the input/output port at which light is detected to the management control functioner 100. The subscriber device 800-1 transmits a connection switch request to the management control functioner 100.

The connection switch request includes information indicating the subscriber device that is the new connection destination. Receiving the connection switch request, the management control functioner 100 transmits an ACK to the subscriber device 800-1 that is the transmission source. The management control functioner 100 determines the wavelength or the like to be used for communication between the subscriber device 800-1 and the subscriber device to be newly connected.

When the wavelength or the like to be used for communication with the subscriber device to be newly connected is determined through the above process, the management control functioner 100 outputs a new control signal for setting the wavelength to be used to the control signal superimpositioner 200, and the control signal superimpositioner 200 superimposes a superimposition signal. Note that, in the above description, the configuration using the "control TRx" has been described as an example that receives a signal from the subscriber device 800-1. However, since any Tx is not necessary, a "control Rx" may be used instead of the "control TRx". Further, the "control Rx" is only required to be capable of receiving a low-speed signal using an auxiliary management and control channel (AMCC), and accordingly, does not need to be a receiver for the main signal (a receiver of 10-G (bit/second) class, for example).

The subscriber device 800-1 receives the superimposed new control signal, and sets the wavelength to be used in communication with another subscriber device. After that, the switch 900-1 switches paths under the control of the optical SW control functioner 700 (S2).

The control signal superimpositioner 200 enables transmission of a control signal for managing the wavelength from the management control functioner 100, even after a subscriber device completes communication with a desired connection destination. Although a case where the switching request is transmitted from the subscriber device 800-1 has been described as an example of the case of connection with another subscriber device, the present invention is not limited to this. For example, the management control functioner 100 may switch connection destinations due to a failure in an optical communication path or various related devices. Further, a control signal superimpositioner may also be provided between the subscriber device 800-1 and the destination to which the connection destination has been switched in $2.

(Third Modification)

Figure 6:
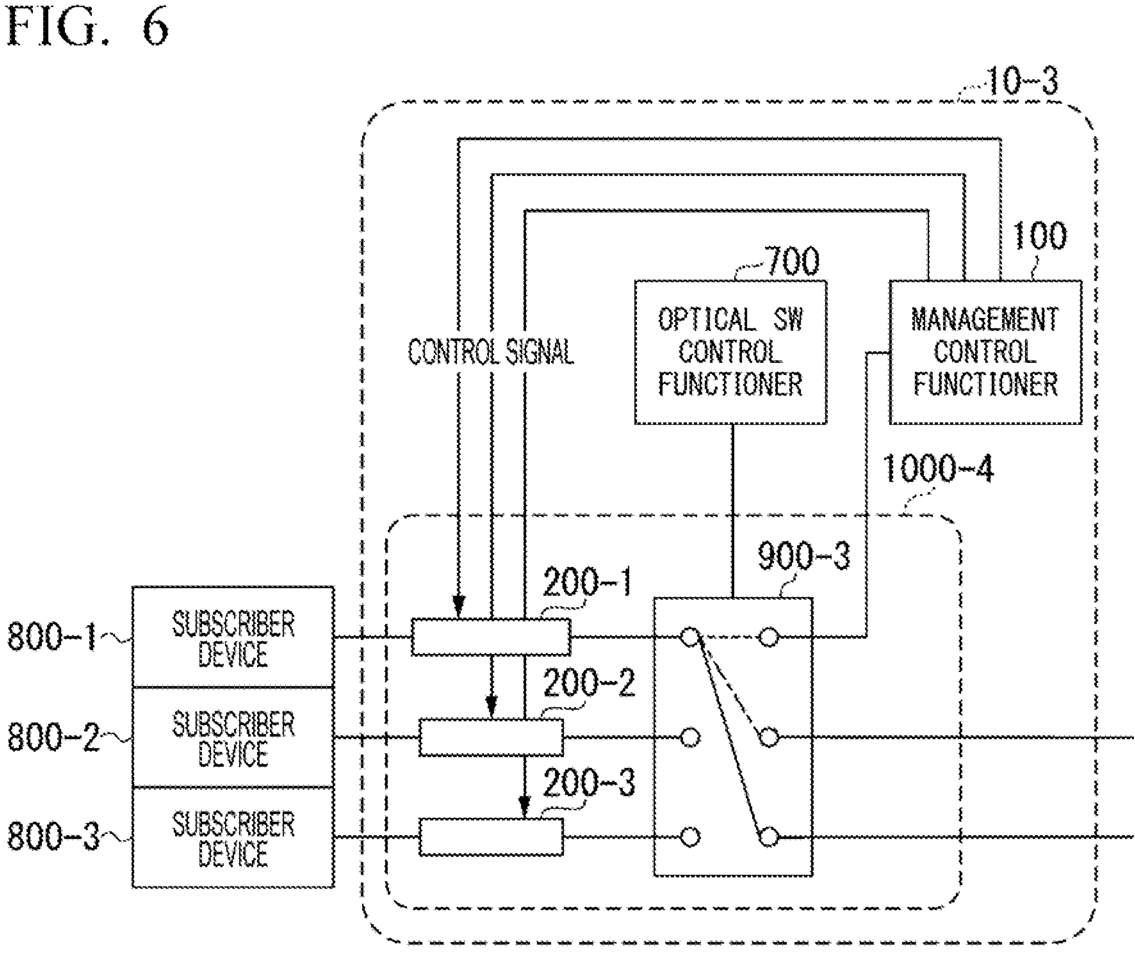
FIG. 6 is a diagram illustrating an example configuration of an optical communication device 10-3.

Instead of the configuration illustrated in FIG. 5, the control signal superimpositioner 200 may be provided between subscriber devices and a switch. Referring to FIG. 6, this configuration is specifically described. FIG. 6 is a diagram illustrating an example configuration of an optical communication device 10-3 that is a third modification of the optical communication device 10. The optical communication device 10-3 according to the third modification includes a switch 900-1 and an optical SW control functioner 700. Further, a control signal superimpositioner is provided for each subscriber device. In the case illustrated in FIG. 5, control signal superimpositioners 200-1, 200-2, and 200-3 are provided for subscriber devices 800-1, 800-2, and 800-3, respectively.

The subscriber device 800-1 is provided between the subscriber device 800-1 and the switch 900-3. The subscriber device 800-2 is provided between the subscriber device 800-2 and the switch 900-3. The subscriber device 800-3 is provided between the subscriber device 800-3 and the switch 900-3. Each of the subscriber devices 800-1, 800-2, and 800-3 is connected to the optical communication device 10-2 by an optical fiber.

The control signal superimpositioner 200 is connected to the control signal superimpositioners 200-1, 200-2, and 200-3. The control signal superimpositioner 200 outputs a new control signal to each of the control signal superimpositioners 200-1, 200-2, and 200-3.

An operation to be performed when the subscriber device 800-1 is newly connected in the configuration illustrated in FIG. 6 is now described. The subscriber device 800-1 is first connected to the management control functioner 100 by the switch 900-3. In the subscriber device 800-1, the wavelength corresponding to the communication destination (a service, a user, or the like) is set by the management control functioner 100.

After that, the switch 900-3 switches paths under the control of the optical SW control functioner 700. As a result, the subscriber device 800-1 starts communication with a desired connection destination. In a case where the subscriber device 800-1 is connected to another subscriber device different from the desired connection destination during communication between the subscriber device 800-1 and the desired connection destination, the management control functioner 100 outputs a new control signal to the control signal superimpositioners 200, and the control signal superimpositioners 200 superimpose a superimposition signal, as in the second modification.

Since the configuration described in the third modification is a configuration in which control signal superimpositioners are provided for the respective subscriber devices, the load of management and control by the management control functioner 100 is made smaller compared with that in the configuration described in the second modification.

The management control functioner 100, the control signal superimpositioners 200, 200-1, and 200-2, and the optical SW control functioner 700 may be formed with a processor such as a central processing unit (CPU) and a memory. In this case, the processor in each component executes a program, so that the management control functioner 100, the control signal superimpositioners 200, 200-1, and 200-2, and the optical SW control functioner 700 function as the management control functioner 100, the control signal superimpositioners 200, 200-1, and 200-2, and the optical SW control functioner 700. Note that all or some of the functions of the management control functioner 100, the control signal superimpositioners 200, 200-1, and 200-2, and the optical SW control functioner 700 may be formed with hardware such as an application specific integrated circuit (ASIC), a programmable logic device (PLD), or a field programmable gate array (FPGA). The program may be recorded in a computer-readable recording medium. Examples of the computer-readable recording medium include portable media such as a flexible disk, a magneto-optical disk, a ROM, a CD-ROM, and a semiconductor storage device (a solid state drive (SSD), for example), and storage devices such as a hard disk and a semiconductor storage device incorporated in a computer system. The program may be transmitted via a telecommunication line.

Although an embodiment of the present invention has been described in detail with reference to the drawings, specific configurations are not limited to the embodiment, and include designs and the like without departing from the scope of the invention.

INDUSTRIAL APPLICABILITY

The present invention can be applied to optical communication devices that perform communication through optical fibers.

REFERENCE SIGNS LIST

10, 10-1, 10-2, 10-3: optical communication device
100: management control functioner
200, 200-1, 200-2, 200-3: control signal superimpositioner
210: signal timing detector
220: optical modulator
300, 400: optical transmitter/receiver
500, 600: transmission/reception separator
700: control functioner
800-1, 800-2, 800-3, 800-4: subscriber device
900-1, 900-2, 900-3: switch

The invention claimed is:

1. An optical communication device comprising:

a detector that detects a falling edge or a rising edge of a control signal outputted from a user device to an optical communication path; and an optical modulator that superimposes a new control signal on a main signal, when a falling edge or a rising edge of a control signal has been detected by the detector.

2. The optical communication device according to claim 1, wherein when a time from detection of the falling edge of the control signal by the detector to superimposition of the new control signal by the optical modulator is indicated as $T_A$, when an interval at which the user device transmits the control signal is indicated as $T_B$, and when a transmission time of the control signal is indicated as $T_C$, the optical modulator is configured to generate the new control signal so as to satisfy $T_A \leq (T_B - T_C)/2$, and is configured to superimpose the generated new control signal on the main signal.

3. The optical communication device according to claim 1, wherein the optical modulator comprises:

an uplink-signal optical modulator that superimposes a new control signal on an uplink main signal which was output to a first optical communication path, and a downlink-signal optical modulator that superimposes a new control signal on a downlink main signal which was output to a second optical communication path.

4. The optical communication device according to claim 1, further comprising a setter that sets a wavelength to be used by the user device for communication with another connection destination; and a connection destination switcher that switches connection destinations of the user device, wherein, when the user device starts communication with a desired connection destination, the connection destination switcher connects the user device and the desired connection destination via the optical modulator, and, when the user device switches from the desired connection destination to the another connection destination and starts communication, the optical modulator superimposes the new control signal, on the main signal, for setting the wavelength set by the setter.

5. The optical communication device according to claim 1, further comprising a setter that sets a wavelength to be used by the user device for communication with another communication destination; and a connection destination switcher that switches connection destinations of the user device, wherein, the user device is connected to the connection destination switcher via the optical modulator provided for each user device, when the user device starts communication with a desired connection destination, the connection destination switcher connects the user device and the desired connection destination, and, when the user device switches from the desired connection destination to the another connection destination and starts communication, the optical modulator superimposes the new control signal, on the main signal, for setting the wavelength set by the setter.

6. The optical communication device according to claim 2, wherein the optical modulator comprises:

an uplink-signal optical modulator that superimposes a new control signal on an uplink main signal which was output to a first optical communication path, and a downlink-signal optical modulator that superimposes a new control signal on a downlink main signal which was output to a second optical communication path.

7. A control method comprising:

detecting a falling edge or a rising edge of a control signal outputted from a user device to an optical communication path; and superimposing a new control signal on a main signal, when a falling edge or a rising edge of a control signal has been detected in the detection step.

* * * * *